(12) United States Patent
Bakker et al.

(10) Patent No.: US 8,894,903 B2
(45) Date of Patent: Nov. 25, 2014

(54) METHOD FOR THE MANUFACTURE OF A FIBER-REINFORCED COMPONENT

(75) Inventors: Patrick Bakker, Stuhr (DE); Frank Brueggemann, Wayhe (DE); Klaus Edelmann, Bremen (DE); Guenter Hoppe, Oyten (DE)

(73) Assignee: Airbus Operations GmbH, Hamburg (DE)

( * ) Notice: Subject to any disclaimer, the term of this patent is extended or adjusted under 35 U.S.C. 154(b) by 794 days.

(21) Appl. No.: 12/980,394

(22) Filed: Dec. 29, 2010

(65) Prior Publication Data

US 2011/0155854 A1 Jun. 30, 2011

Related U.S. Application Data

(60) Provisional application No. 61/290,520, filed on Dec. 29, 2009.

(30) Foreign Application Priority Data

Dec. 29, 2009 (DE) .......................... 10 2009 060 689

(51) Int. Cl.
*B29C 45/14* (2006.01)
*B29C 70/76* (2006.01)

(52) U.S. Cl.
USPC ............ 264/266; 264/294; 264/160; 264/275

(58) Field of Classification Search
None
See application file for complete search history.

(56) References Cited

U.S. PATENT DOCUMENTS

| | | | | |
|---|---|---|---|---|
| 3,549,477 A | * | 12/1970 | Burgman | 428/335 |
| 5,217,766 A | * | 6/1993 | Flonc et al. | 428/34.5 |
| 8,119,048 B2 | * | 2/2012 | Nishimura | 264/252 |
| 2002/0106952 A1 | * | 8/2002 | Hashizume et al. | 442/43 |
| 2005/0257998 A1 | | 11/2005 | Sato et al. | |
| 2013/0001817 A1 | * | 1/2013 | Bessho et al. | 264/45.3 |
| 2013/0033158 A1 | * | 2/2013 | Schmidt et al. | 312/223.1 |

FOREIGN PATENT DOCUMENTS

| | | | |
|---|---|---|---|
| DE | 1852612 | U | 5/1962 |
| DE | 2337516 | A | 9/1974 |
| DE | 8915724 | U1 | 5/1991 |
| DE | 19931691 | A1 | 1/2001 |
| GB | 1419460 | A | 12/1975 |
| JP | 10138354 | * | 5/1998 |
| JP | 2009-051080 | A | 3/2009 |

* cited by examiner

*Primary Examiner* — Edmund H. Lee
(74) *Attorney, Agent, or Firm* — Leydig, Voit & Mayer, Ltd.

(57) ABSTRACT

A method for the manufacture of a fiber-reinforced component includes heating a blank of a carbon-fiber-reinforced thermoplastic plastic material to at least a melting temperature of the thermoplastic plastic material; introducing the blank into an at least two-part molding tool; forming the fiber-reinforced component by applying pressure on the blank using the molding tool; and injecting a further thermoplastic plastic material into at least one edge region of the molding tool so as to form an edge seal.

6 Claims, 2 Drawing Sheets

METHOD FOR THE MANUFACTURE OF A FIBER-REINFORCED COMPONENT

CROSS REFERENCE TO PRIOR APPLICATIONS

Priority is claimed to German Application No. DE 10 2009 060 689.0, filed Dec. 29, 2009 and to U.S. Provisional Application No. 61/290,520, filed Dec. 29, 2009. The entire disclosure of both applications is incorporated by reference herein.

FIELD

The invention relates to a method for the manufacture of a fiber-reinforced component, in particular of a connecting angle formed with a carbon-fiber-reinforced thermoplastic plastic material for the connection of frame elements to an exterior skin of a fuselage cell of an aircraft.

The invention moreover relates to a device for the manufacture of a fiber-reinforced component, in particular of a connecting angle formed with a carbon-fiber-reinforced thermoplastic plastic material, with an at least two-part moulding tool for forming a plate-shaped tailored blank so that it becomes the component.

Furthermore, the invention relates to a fiber-reinforced component, in particular manufactured according to the method, comprising an integral thermoplastic edge seal.

BACKGROUND

In order to save weight, fiber-reinforced plastic materials are increasingly used in modern aircraft construction. Plastic materials used include predominantly duroplastic plastics, for example epoxy resins, which in many cases are reinforced with carbon fibers and comprise an extraordinarily favourable ratio of weight to mechanical strength. Processing the fiber-reinforced duroplastic plastics is often involved and expensive because large-format heatable moulds or autoclaves with vacuum bags are required in order to be able to cure components with the application of pressure and/or temperature to form finished components that are true to shape. Furthermore, the introduction of the reinforcement fibers, in particular their alignment so that it takes into account the flow of force, prior to the impregnation process causes additional difficulties. Moreover, the production of large numbers of carbon-fiber-reinforced duroplastic components while at the same time ensuring good and reliable reproducibility of the geometric and mechanical specifications can be achieved only at significant expense. In recent times fiber-reinforced thermoplastic materials have promised a remedy to the aforesaid, which fiber-reinforced thermoplastic materials can be manufactured with justifiable expenditure in large numbers with constantly good dimensional accuracy, albeit with slightly inferior mechanical properties.

For example, in a primary structure of a mid-sized passenger aircraft up to 15,000 connecting angles are installed in order to interconnect the frame elements and the fuselage cell skin. These connecting angles, or other composite components, can, for example, be manufactured by means of the so-called thermoplastic "stamp forming method". In this process a blank is cut out of a carbon-fiber-reinforced semifinished product, is heated to above the melting temperature of the thermoplastic plastic, and by means of a likewise heated moulding tool is formed so that it becomes the component with the required component geometry.

During the forming process, for example during right-angle edging of a plate-shaped thermoplastic semifinished product with several reinforcement fiber layers positioned one above the other, due to the so-called "telephone directory effect" and consequently locally different bending radii, bevel formation results in the region of the component edges; in other words, due to interlaminar gliding, inclined edge surfaces form. In a subsequent method-related step, the very sharp-edged edge surfaces, which thus result in the lower region as a result of the material being thin in that location, and as a result of further material, which is excess in the edge region, are separated from the formed component. At the same time the component is given the specified desired dimensions.

Separation can, for example, take place by means of mechanical milling, sawing or water jet cutting. In the region of the component edges reworked in this manner, which component edges now extend perpendicularly to the top or bottom of the component, the reinforcement fibers, which are preferably carbon fibers, as a rule exit perpendicularly so that when these CAP components are connected to metal components, in particular aluminium alloy components, contact corrosion can occur. In order to prevent in particular the occurrence of contact corrosion phenomena, and in order to prevent any associated structural weakening, the reworked component edges generally speaking need to be sealed with an edge seal, for example in the form of a two-component paint or varnish. Application of the paint or varnish can, for example, take place manually by means of a brush.

From DE 89 15 724 U1 for example the creation of a cast edge on a lightweight plate with a honeycomb core structure is known. However, the cast edge is formed subsequently with the use of a castable plastic material.

SUMMARY OF THE INVENTION

An aspect of the present invention provides a simplified and easily automatable method for the manufacture of, in particular, fiber-reinforced thermoplastic plastic components in great numbers, which components after completion of the forming process already comprise integral edge sealing, at least in some sections, and which components are at the same time directly dimensionally accurate so that no further mechanical reworking steps are needed any longer in order to achieve the specified geometry and/or in order to create the edge seal.

In an embodiment, a method comprises the following steps:
a) heating of a blank to above a melting temperature of the thermoplastic plastic material,
b) introduction of the blank into an at least two-part moulding tool,
c) forming of the blank so that it becomes the component by means of the moulding tool under the application of pressure, and
d) simultaneous injection, at least in some sections, of a thermoplastic plastic material into at least one edge region of the moulding tool for forming an edge seal at least in some sections.

To this effect the blank that has been formed so that it becomes the finished component has from the very beginning been given an integral thermoplastic edge seal, free of any carbon fibers, which edge seal prevents contact corrosion, and is at the same time dimensionally accurate so that further mechanical reworking steps are no longer required. Moreover, the sharp edges, which otherwise arise in the edge region of the component as a result of interlaminar gliding during the forming process, are blunted, i.e. made safe, so that the component can be handled without any danger of injury.

Forming primarily takes place under the effect of high pressing pressure that is generated by the moulding tool and that is acting on the already heated blank. The tool temperature is to be selected such that a specified cooling rate is maintained.

In an embodiment of the method, preferably the same plastic material is injected that is used for the fiber-reinforced component.

This results in a particularly sound and mechanically loadable bond between the edge seal and the fiber-reinforced component. For example polyphenylenesulfide (PPS) polyetheretherketone (PEEK), polyetherimide (PEI) polyetherketoneketone (PEKK) or polyethylenenterephthalate (PET) can be used.

In a further embodiment of the method the blank is separated from a preferably plate-shaped semifinished product in order to give said blank a predetermined initial contour.

In this arrangement the initial contour is preferably to be determined geometrically in such a manner that following the forming process the final geometric shape of the fiber-reinforced component is already obtained so that there is no need for any reworking steps.

According to a further embodiment of the method, separating the blank from the plate-shaped semifinished product takes place by cutting, milling, sawing, grinding, water jet cutting or any desired combination of at least two of these methods.

This approach ensures very good dimensional accuracy of the separated contour while at the same time ensuring high processing speeds. Furthermore, in particular, water jet cutting provides an advantage in that the blank can be cut from the semifinished product by means of a water jet that is inclined relative to the top so that the cut edges extend at least in some sections at an angle of inclination of less than 90° relative to horizontal. The angle of inclination can be selected such that, after the process of forming the blank, component edges that are at a right angle in relation to the component top and to the component bottom of the finished component are automatically obtained.

Furthermore, in an embodiment a device is provided, according to which in at least one edge region of the moulding tool at least one nozzle is provided through which a thermoplastic plastic material can be injected to form an edge seal of the component at least in some sections.

In this way it is possible already during the forming process to provide integral edge sealing so as to prevent contact corrosion. Furthermore, the device makes possible a forming process of the blank, which has been heated to above melting temperature in an upstream oven, which forming process results in directly dimensionally accurate fiber-reinforced components that generally speaking do not require any further subsequent treatment. The device also makes it possible to manufacture fiber-reinforced components in large numbers.

In a further embodiment of the device the moulding tool comprises at least one top tool and at least one bottom tool which together in the closed state form an interior space that corresponds to the spatial shape of the component to be produced. As used herein, the interior space corresponding to the spatial shape of the component to be produced means essentially corresponding.

Consequently, according to a forming process that preferably takes place in one pass, as a rule an already dimensionally accurate component is obtained.

According to a further embodiment of the invention, the at least one cavity is delimited by at least one tool sidewall and at least one bevel area resulting from the forming process, wherein the thermoplastic plastic material can be injected into the cavity by means of the at least one nozzle.

The hollow space, which due to the inclined component edges as a rule will have a prismatic shape, arises as a result of the interlaminar gliding of the layers of reinforcement fibers within the thermoplastic semifinished product during the forming process, and as a result of injection of the thermoplastic plastic material makes possible an integral design of the edge seal that is free of any reinforcement fibers. In this arrangement the hollow space always extends parallel to the axis or axes on which the initially planar blank is formed or "bevelled". In contrast to this, if the blank is cut from the semifinished material, for example by means of water jet cutting, in such a manner that the cutting edges extend at least in some sections at an angle of inclination of less than 90° relative to horizontal, after the forming process, with correct selection of the angle of inclination, at least in some sections directly right-angled component edges can result. In such a constellation the geometric shape of the cavity into which the thermoplastic material is injected for the purpose of sealing the edge in a process that is comparable to the known injection moulding method as a rule is approximately cuboid.

An embodiment of the device provides for the at least one nozzle to be arranged in the at least one top tool and/or the at least one bottom tool.

As a result of this, injection of the thermoplastic plastic material takes place in the region of the void, which region has the widest opening. Depending on the geometric shape of the cavity and/or its spatial position relative to the moulding tool, in a manner that differs from the aforesaid it may be advantageous to integrate the nozzles in the bottom tool or in both tool parts.

According to a further embodiment, the at least one nozzle comprises a cylindrical shape with an end taper. As used herein, a cylindrical shape means an essentially cylindrical shape As a result of this shape a largely defined mass flow of the plastic material enters the cavity through the nozzle. In this arrangement the injection process of edge sealing is comparable to the known injection moulding processes that are widely used in the plastics-processing industry.

Furthermore, an embodiment of the invention provides a fiber-reinforced component according to which the component comprises at least in some sections an edge seal formed by means of a thermoplastic plastic material that is free of any reinforcement fibers, wherein the edge seal comprises a triangular or rectangular cross-sectional geometry. As used herein, a triangular or rectangular cross-sectional geometry means an approximately triangular or rectangular cross-sectional geometry Due to the presence of the integral edge seal the component according to the invention can without any problems be integrated in a primary structure of an aircraft in CFP/metal construction (so-called hybrid construction), because as a result of the thermoplastic edge seal it is not possible for electrochemical contact corrosion effects to occur. The resulting edge seal can comprise an essentially wedge-shaped or triangular or quadrangular, in other words square or cuboid, cross-sectional geometry.

BRIEF DESCRIPTION OF THE DRAWINGS

The drawing shows the following.

Identical construction elements in the drawings have the same reference characters.

DETAILED DESCRIPTION

Figure 1:
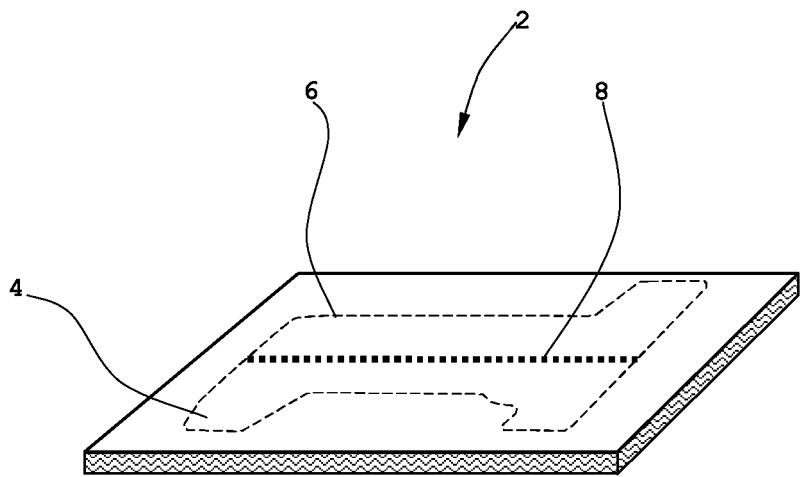
FIG. 1. a perspective view of a plate-shaped semifinished product with a blank that has been separated, FIG. 2 a perspective view of the blank, shaped as a result of angle forming of the formed blank according to FIG. 1, FIG. 3 a diagrammatic view of two edge regions of a formed blank without integral edge seal, and FIG. 4 a representation showing the principle of a device for the forming according to the method of a fiber-reinforced component with integral edge sealing.

FIG. 1 shows a plate-shaped semifinished product that preferably comprises a carbon fiber-reinforced thermoplastic plastic material.

A likewise plate-shaped semifinished product 2 comprises a thermoplastic matrix in which reinforcement fibers, for example carbon fibers, are embedded. The thermoplastic matrix can, for example, comprise a polyphenylenesulfide (PPS) polyetheretherketone (PEEK), polyetherimide (PEI) polyetherketoneketone (PEKK) or polyethylenenterephthalate (PET) or some other high-performance plastics. In order to exclude any surface corrosion effects, apart from possible contact corrosion in the component edge region, also in the region of the top and bottom (not shown with reference characters) of the formed component, in each case below the top or below the bottom layers of reinforcement fibers, which comprise glass fibers, can be embedded in the thermoplastic matrix of the semifinished product 2 as the last or final layers.

From a middle region (not designated) of the thermoplastic semifinished product 2 a blank 4 has been separated by a suitable method, as indicated by the dashed line, but has not yet been removed. Separation can, for example, take place by sawing, milling, cutting, grinding, water jet cutting or the like, wherein excessive heat development should be avoided in order to prevent the blank smudging in the region of the cut edges. Provided it comprises a corresponding geometric shape, the blank 4 can also be separated in an edge position relative to the semifinished product so that the separation length is reduced accordingly. An initial contour 6 of the blank 4 is calculated and dimensioned in such a manner that after the forming process for creating the component, which forming process may take place in multiple stages, said component in an ideal case already comprises the final and dimensionally accurate three-dimensional spatial shape with the specified dimensions.

If the blank 4 is cut out of the semifinished product 2 by means of a high-pressure water jet, said water jet can, at least in some sections, be guided at an angle of inclination of <90° relative to the top (not shown) of the semifinished product 2 so that in these sections bevelled cut edges result. With a corresponding selection of the angle of inclination a situation can be achieved in which, during forming or "sliding off" the plasticised blank after curing, directly rectangular component edges relative to the component top or the component bottom result. Such bevelled cut edges can, moreover, also be produced by means of milling or sawing.

Figure 2:
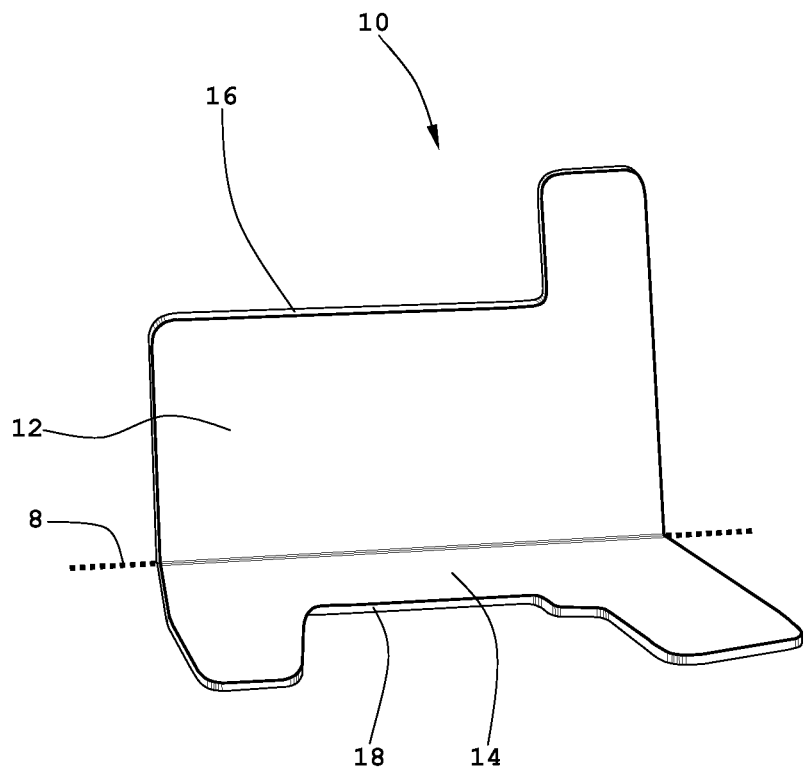

In the exemplary embodiment shown, forming or sliding off the blank 4 takes place essentially along the dotted forming axis 8; in other words, by means of a moulding tool not shown in FIGS. 1, 2, the semifinished product 2 is "bevelled" or slid off on the axis 8. In order to create fiber-reinforced components comprising a more complicated spatial geometry, as a rule several forming axes 8 are required, in particular forming axes that do not extent so as to be parallel to each other.

FIG. 2 shows a connecting angle 10 that was created by forming the blank 4 by means of a moulding tool on the axis 8.

The connecting angle 10 comprises two limbs 12, 14 which in the embodiment shown interconnect at an angle of approximately 90° in the region of the axis 8. In each case the limbs 12, 14 comprise different contours in order to allow connection (not shown) of a frame element to a fuselage cell skin of a primary structure of an aircraft. According to the invention the component edges 16, 18 of the limbs 12, 14 already comprise the integral thermoplastic edge seal, which is essentially free of reinforcement fibers, to provide protection against contact corrosion. For the sake of clarity said edge seal is not shown in FIG. 2.

Figure 3:
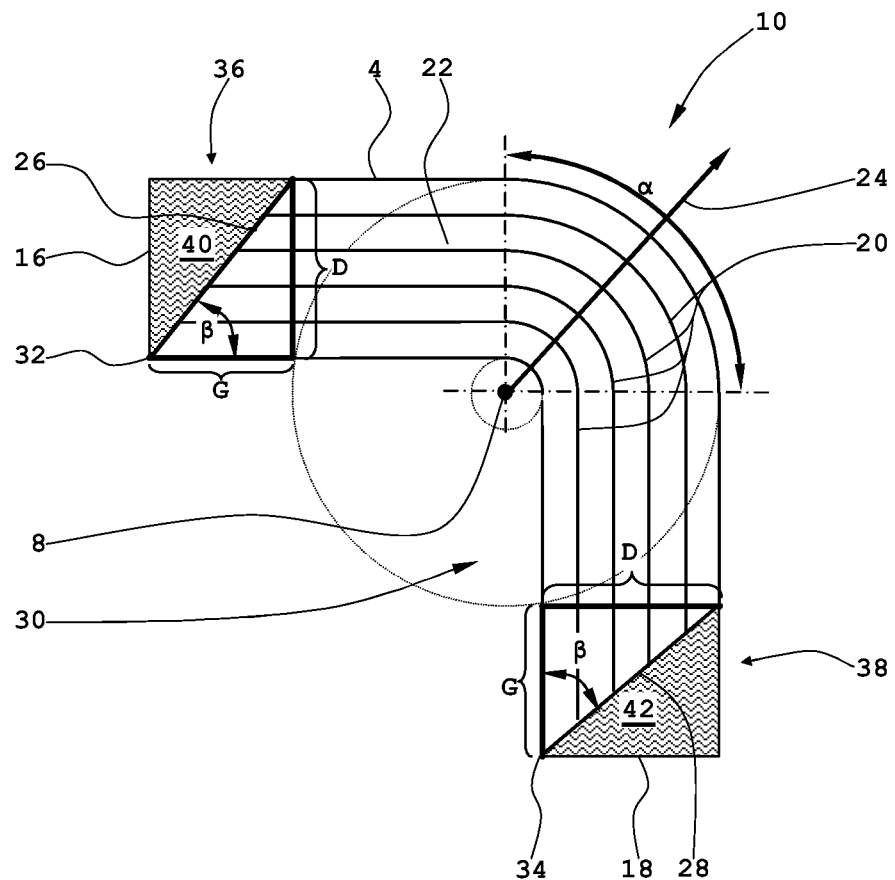

FIG. 3 shows a diagrammatic view of the connecting angle 10 according to FIG. 2 in the direction of view onto the forming axis 8 after completion of the forming process with a complete integral edge seal.

Forming of the blank 4 takes place by so-called "sliding off" (bevelling, angling off) of the blank 4 heated up in an oven (not shown) and consequently plasticised and initially still planar, on the forming axis 8 by means of a tempered moulding tool (also not shown in FIG. 3). In this process the layers of reinforcement fibers 20 slide within a matrix 22, formed by the plasticised thermoplastic plastic material, relative to each other or one on top of the other. Due to the gliding paths, which gradually increase in the direction of the arrow 24, of the interlaminar sliding movement, in the region of the component edges 16, 18 inclined bevel faces 26, 28 arise, which in the region of the bottom 30 or the top (not designated) of the connecting angle 10 result in extremely sharp-edged edge lines 32, 34 that pose a danger of injury.

At a given material thickness D of the blank 4, with a forming angle $\alpha$ in each case a gliding length G results that follows the equation $G=(D*\pi)/4$. However, this equation only applies at a forming angle $\alpha$ of 90°. The thinner the selected material thickness D and/or the forming angle $\alpha$, the shorter the sliding lengths G and the associated formation of the bevelled (inclined) bevel faces 26, 28, wherein the angle $\beta$ increases correspondingly. In the limiting case of a forming angle $\alpha$ of 0° the angles $\beta$ in each case are 90°, in other words the bevel faces 26, 28 extend perpendicularly to the bottom 30 or to the top of the connecting angle 10.

According to the invention, in the edge regions 36, 38 of the connecting angle 10 during the forming process in each case an edge seal 40, 42 is created as a result of the injection of a thermoplastic material. The plastic used for creating the edge seal 40, 42 is preferably the same thermoplastic material that is used to form the matrix 22 in order to achieve an optimum mechanical connection between the edge seals 40, 42 and the connecting angle 10. In those cases where the blank 4 initially comprises edges that at least in some sections are inclined in a proper angle (shafted, bevelled) the component edges 16, 18 can be at a right angle after completion of the gliding process, in other words the bevel faces 26, 28 coincide in this case with the component edges 16, 18, and the angle $\beta$ is approximately 90°. The edge seal 40, 42 formed in this way not only prevents the occurrence of contact corrosion, in particular in the region of the bevel faces 26, 28, but also blunts any edge lines 32, 34 thus ensuring safe handling of the finished fiber-reinforced component 10. Finally, the edge seals 40, 42 ensure direct dimensional accuracy of the connecting angle 10 so that generally speaking mechanical reworking steps are no longer necessary to achieve a specified desired geometry.

Figure 4:
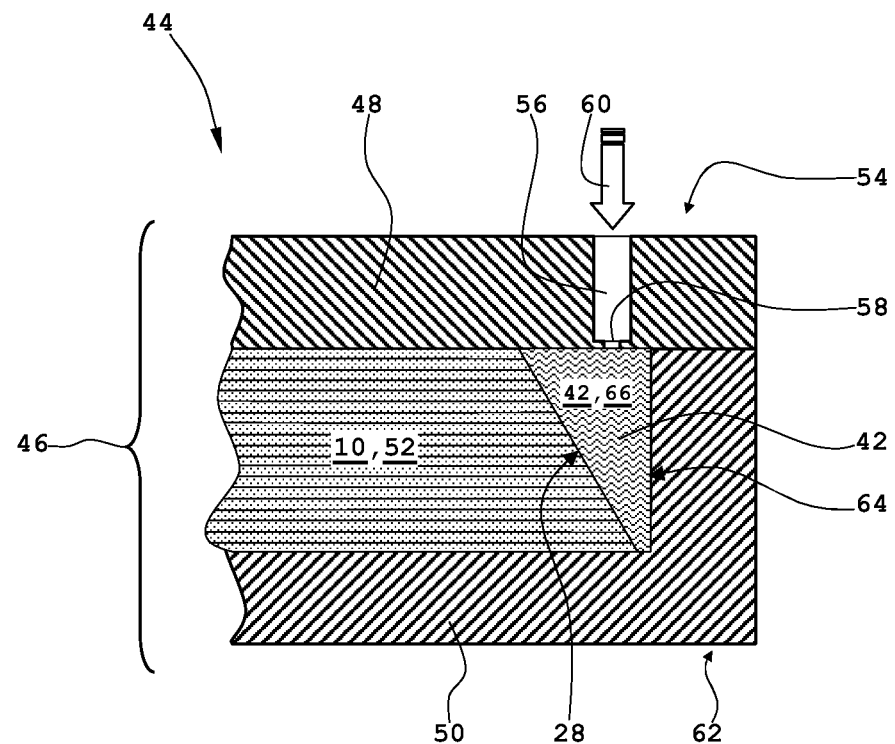

FIG. 4 in a simplified view shows a section of a device for implementing the method according to the invention.

A device 44 comprises a moulding tool 46 with an top tool 48 and a bottom tool 50 which in the closed state as shown form an interior space 52 whose geometry approximately reflects the geometry of the connecting angle 10 to be produced. Depending on the geometric complexity of the fiber-reinforced component to be produced by forming, it may also be necessary to provide a moulding tool that comprises more than two parts, if need by with the use of removable cores. In an edge region 54 of the top tool 48 a nozzle 56 with an end taper 58 is provided. Both the nozzle 56 and the taper 58 each comprise an approximately hollow-cylindrical shape.

Through the nozzle 56 thermoplastic material is injected into the moulding tool 46, during the forming process, as indicated by the white arrow 60, for integral forming of the edges of the edge seal 42. Injecting the thermoplastic plastic to create the edge seal takes place in a manner that is comparable to the well known injection moulding process. As an alternative the nozzle 56 can also be positioned in an edge region 62 of the bottom tool 50. Apart from this, the number and/or the spatial positioning of the nozzle 56 or of further nozzles (not shown) in the moulding tool 46 depends/depend primarily on the spatial design of the connecting angle 10 that is to be produced by means of the device 44 in the stamp forming method, or of some other fiber-reinforced component to be produced. Furthermore, vent bores may be required in the moulding tool 46 in order to be able to expel the air that is situated in the region of the edge seal 42, which edge seal is to be formed by injection of the thermoplastic material. If required negative pressure can be applied to the vent bore in order to prevent cavities from arising in the edge seal 42.

On the side of the connecting angle 10 the edge seal 42 follows on, which edge seal 42 is formed as a result of injection of the thermoplastic material, which edge seal 42 in the example shown in FIG. 4 is prismatic and wedge-shaped, which in the exemplary embodiment shown comprises an approximately triangular cross-sectional geometry. Prior to injection of the plastic material, in the edge region 54 of the moulding tool 46 a cavity 66 exists between a tool sidewall 64 and the bevel face 28 that is formed in the course of the forming process and that is inclined, with the geometric shape of said cavity 66 corresponding to the edge seal 42 to be formed.

Both the top tool 48 and the bottom tool 50 can be precisely temperature-adjusted by means of heating devices (not shown) in order to prevent cooling of the inserted blank to be formed. For the actual forming process the blank 4 is heated to a temperature that is above the melting temperature of the thermoplastic matrix (plasticisation).

If the thermoplastic matrix comprises, for example, polyphenylenesulfide (PPS), the melting temperature of the blank 4 is approximately 285° C. In an oven (not shown in the figures) or in a suitable heating device that makes it possible to obtain heat as evenly as possible over a flat surface, the blank 4 is first heated to a temperature of approximately 340° C. and is only thereafter placed in the moulding tool 46 that for the forming process has been heated to a temperature of approximately 200° C. Generally speaking, a blank 4, in each case depending on the thermoplastic material used to form the matrix, is heated to a temperature that is approximately 60° C. above the melting temperature of the thermoplastic material. Furthermore, the temperature must be sufficiently high for the heated blank 4 to be adequately plasticised for the forming process for a period of time of approximately 3-20 seconds. As a rule this time window is used for automated placement of the blank 4 in the moulding tool 46.

Furthermore, the top tool 48 and/or the bottom tool 50 are connected to actuators, for example hydraulic cylinders, spindle drives or the like, so that adequate pressing pressure can be built up during the forming process. In order to make it possible to achieve short cycle times, both the top tool 48 and the bottom tool 50 in each case comprise numerous cooling channels or heating channels that can comprise oil or water for temperature control. As an alternative or in addition it is also possible to provide electrical heating of the forming tool 46. After the actual forming process the finished component is cooled, preferably not too quickly, in the moulding tool 46 down to approximately 200° C., according to a defined cooling curve; in other words the tool temperature and thus the temperature of the finished component is evenly reduced over time.

Apart from this the typical process sequence of the method according to the invention with the use of the device 44 explained above is as follows:

In an optional upstream method-related step from a sheet-like carbon-fiber-reinforced thermoplastic semifinished product a blank is separated, by means of the already mentioned separation methods, with a specified initial contour, and is subsequently removed from the semifinished product. This step can be omitted if the semifinished product has already been suitably cut to size by the manufacturer.

In a first method-related step the blank is heated to above the melting temperature of the thermoplastic plastic material of the blank 4 in an oven or a heating device. As a rule the blank 4 is brought to a temperature that is approximately 60° C. above the melting temperature of the thermoplastic material which in each case has been used in the blank.

In a further method-related step the heated blank is placed in the open moulding tool 46 of the device 44 that comprises at least one top tool 48 and one bottom tool 50, and if necessary is also aligned or positioned.

In a subsequent method-related step the actual forming of the blank to result in the desired fiber-reinforced component, for example a connecting angle 10, takes place by moving the top tool 48 and the bottom tool 50 so that they come together, wherein, as a rule, a high pressing pressure of between 10 and 100 bar acts on the blank 4 at the point in time of pressing. The thermoplastic plastic material for forming the edge seal is injected at a temperature that is above the melting point of the thermoplastic material used for this. During this forming process, but as a rule when the moulding tool 46 is fully closed, in the edge region 54 of the top tool 48 in addition a thermoplastic material is injected, by way of the nozzle 56, into the interior space 52 of the moulding tool 46 in order to form the edge seal 42. Preferably the same thermoplastic material is used as the injected material, which material forms the matrix 22 of the component, or in which material the individual reinforcement fiber layers are embedded.

Finally, the moulding tool 46 is opened by moving apart the top tool 48 and the bottom tool 50. Opening the moulding tool preferably takes place only if the component, too, has reached the moulding tool temperature of approximately 200° C. The moulding tool 46 comprises the above-mentioned active cooling devices and heating devices in order to keep the moulding tool temperature as far as possible in a constant range of approximately 200° C.

At this stage the formed connecting angle 10, which as a rule is directly dimensionally accurate and during production has already been given an integral edge seal that prevents contact corrosion, can be removed from the mould and can directly be moved on for further processing. Generally speaking, there is no need to undertake mechanical rework of whatever nature, which rework as a rule is labour-intensive. Moreover, the edge seal represents an exactly defined component edge that can, for example, be used as a contact surface for positioning the fuselage cell structure, or which considerably facilitates the placement of drill holes.

LIST OF REFERENCE CHARACTERS

2 Semifinished product
4 Blank

6 Initial contour (blank)
8 Forming axis
10 Connecting angle
12 First limb
14 Second limb
16 Component edge
18 Component edge
20 Layer of reinforcement fibers
22 Thermoplastic matrix
24 Arrow
26 Bevel surface
28 Bevel surface
30 Bottom (connecting angle)
32 Edge line
34 Edge line
36 Edge region (connecting angle)
38 Edge region (connecting angle)
40 Edge seal
42 Edge seal
44 Device
46 Moulding tool
48 Top tool
50 Bottom tool
52 Interior space (moulding tool)
54 Edge region (top tool)
56 Nozzle
58 Taper
60 Arrow
62 Edge region (bottom tool)
64 Tool sidewall
66 Cavity
D Material thickness (blank)
G Glide path
60 Angle (forming angle)
62 Angle (bevel areas)

What is claimed is:

1. A method for the manufacture of a fiber-reinforced component comprising:
heating a blank of a carbon-fiber-reinforced thermoplastic plastic material to at least a melting temperature of the thermoplastic plastic material;
introducing the blank into an at least two-part moulding tool;
forming the fiber-reinforced component by applying pressure on the blank using the moulding tool for reaching a final three-dimensional spatial shape; and
simultaneously injecting a further thermoplastic plastic material during the forming of the fiber-reinforced component into a cavity of at least one edge region of the moulding tool so as to form an edge seal, wherein the cavity forms as a result of interlaminar gliding of layers of reinforcement fibers within the semifinished fiber-reinforced component during the forming process.

2. The method as recited in claim 1, wherein the fiber-reinforced component is a connecting angle for connecting frame elements to an exterior skin of a fuselage cell of an aircraft.

3. The method as recited in claim 1, wherein the further thermoplastic plastic material is the same thermoplastic plastic material of the blank.

4. The method as recited in claim 1, further comprising separating the blank from a semifinished product so as to give the blank a predetermined initial contour.

5. The method as recited in claim 4, wherein the semifinished product is plate-shaped.

6. The method as recited in claim 4, wherein the separating includes at least one of cutting, milling, sawing, grinding and water jet cutting.

\* \* \* \* \*